Patented June 4, 1940

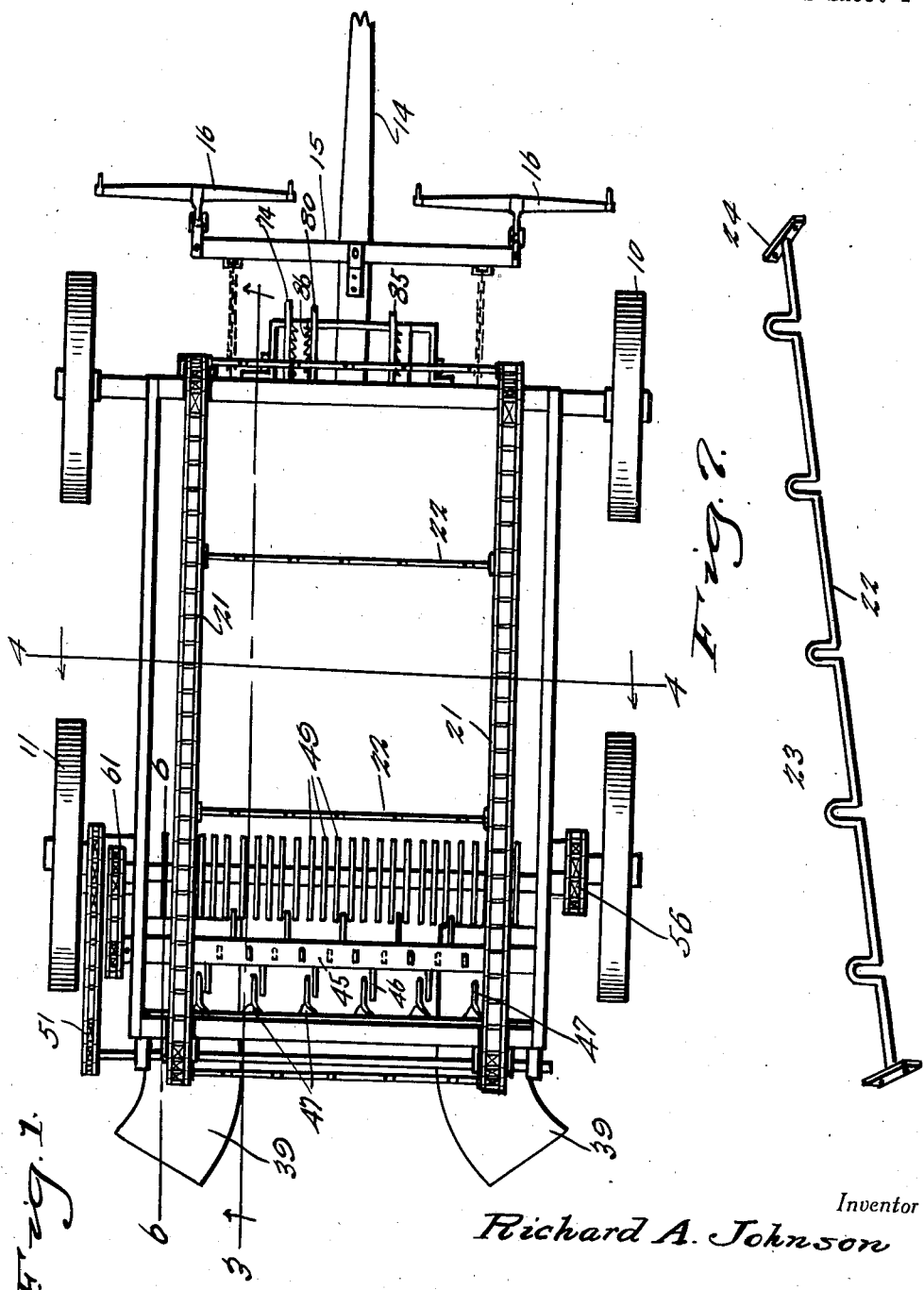

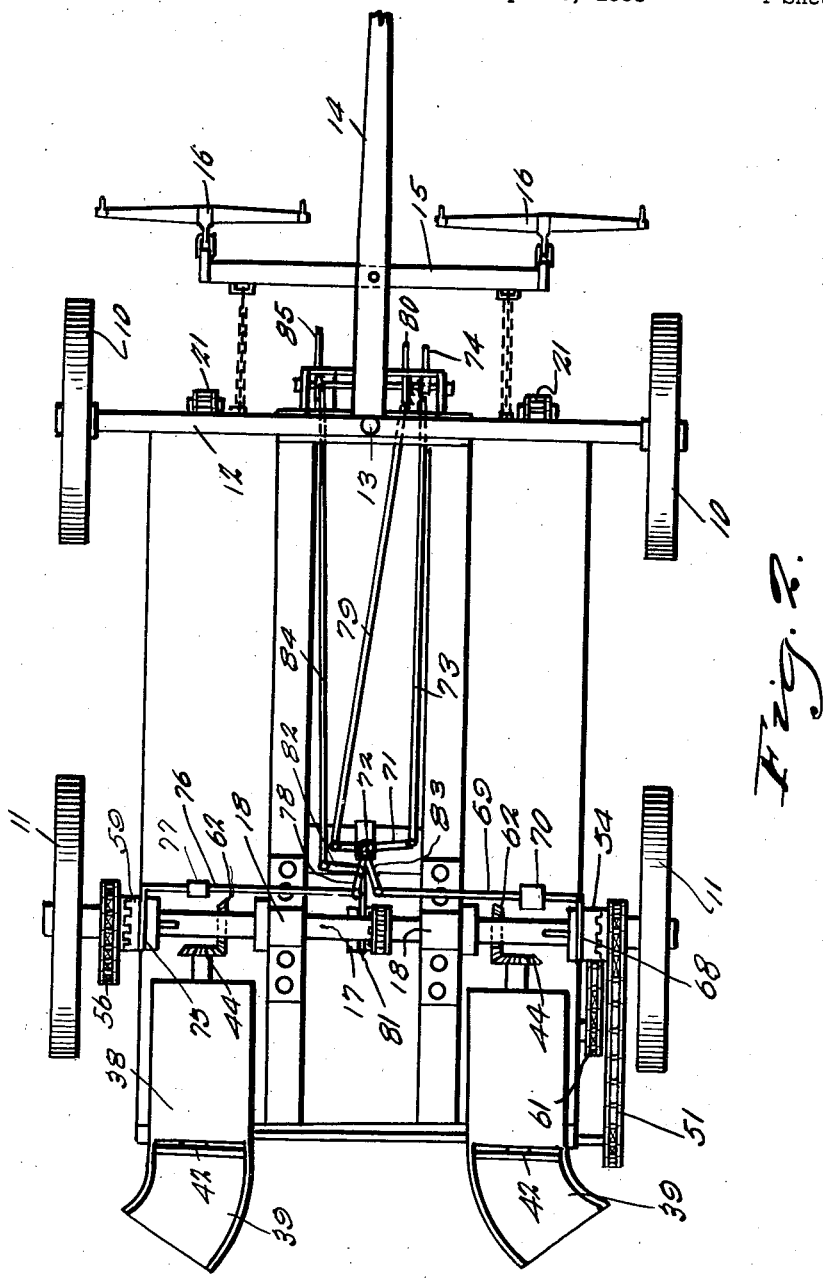

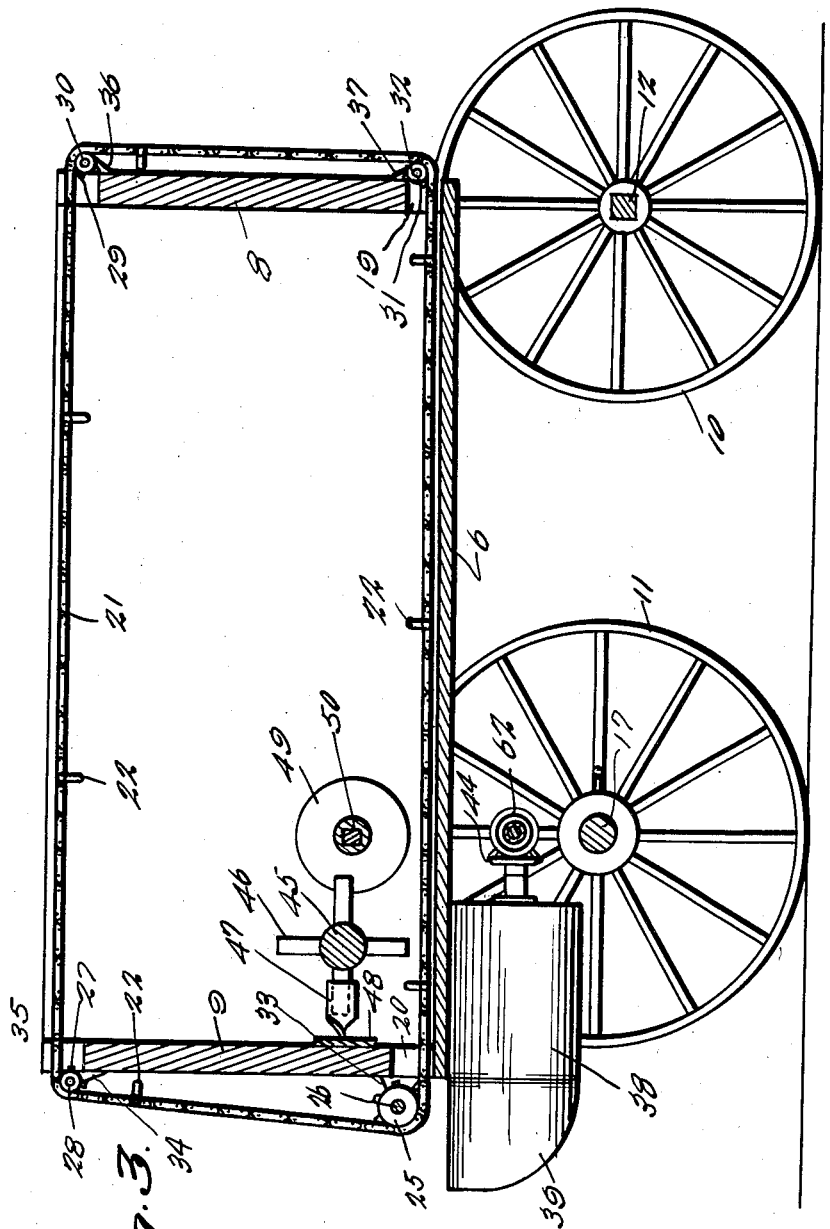

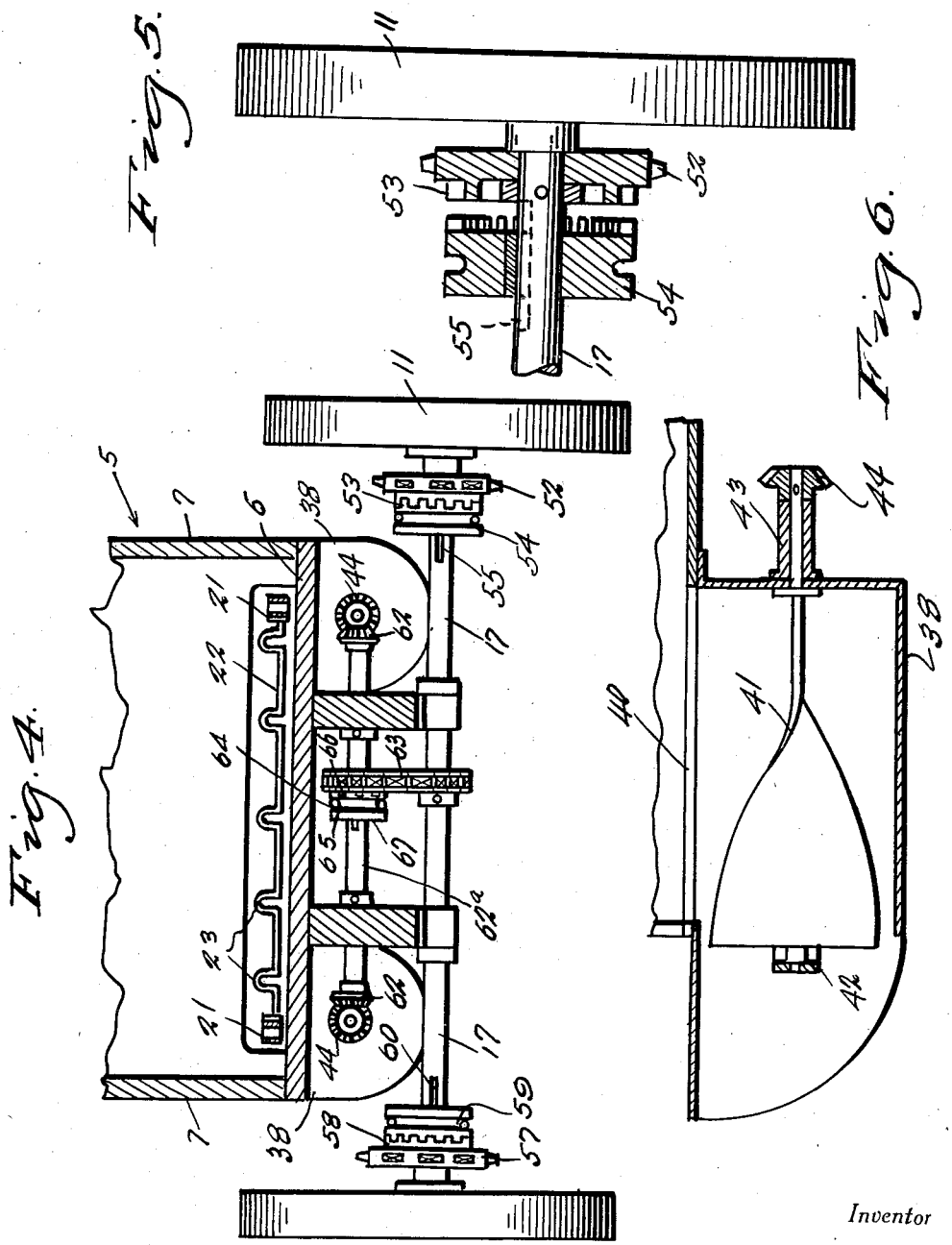

2,202,858

UNITED STATES PATENT OFFICE 2,202,858

MANURE SPREADER

Richard A. Johnson, Moncure, N. C.

Application September 8, 1938, Serial No. 229,034

4 Claims. (Cl. 275—5)

This invention relates to fertilizer distributors of the type comprising a vehicle body mounted on front and rear wheels together with a travelling conveyor the lower run of which feeds the contents of the vehicle body rearwardly to be discharged from the wagon box; and an object of the invention is to provide in a manure distributor of the type mentioned improved means to prevent clogging of the beater mechanism.

A further object of the invention is to provide efficient means for substantially pulverizing the manure as it is fed to the beating mechanism.

A still further object of the invention is to provide for the spreading of the manure laterally outwardly beyond the sides of the machine.

The invention together with its objects and advantages will be best understood from a study of the following description taken in connection with the accompanying drawings wherein:

Figure 1 is a top plan view of the spreader.

Figure 2 is a bottom plan thereof.

Figures 3, 4 and 6 are detailed sectional views taken substantially on the lines 3—3, 4—4 and 6—6 respectively of Figure 1.

Figure 5 is a detail sectional view through a clutch assembly.

Figure 7 is a perspective view of a cross bar forming part of the endless conveyor.

Referring to the drawings by reference numerals it will seen that the distributor comprises a wagon box 5 having a floor 6, sides 7, front wall 8 and rear wall 9. The box 5 is mounted on front wheels 10 and rear wheels 11.

The front axle 12 is mounted for lateral turning movement as indicated generally at 13 and has extending therefrom a draft tongue 14 provided with an evener 15 and whiffle trees 16 in any suitable manner.

The rear axle is indicated by the reference numeral 17 and is journaled in suitable bearings 18 depending from the floor 6 of the wagon box.

For accommodating an endless conveyor which acts to direct the manure towards the rear of the wagon box, the front and rear walls 8 and 9, respectively, are provided at their lower edges with slots or openings 19, 20, the slot 20 being relatively deep as shown in Figure 3 to provide a discharge opening for the wagon box.

The aforementioned conveyor comprises a pair of endless conveyor chains 21 connected together at intervals through the medium of cross rods or cleats 22. As best shown in Figure 7 the cleats 22 are respectively formed from a single length of wire bent at intervals to provide a plurality of longitudinally spaced projections 23. On the respective opposite ends thereof wire 22 is provided with attaching plates 24 through the medium of which and suitable fastening elements the wire is secured to the chains 21.

Chains 21 are trained over sprockets 25 provided on a rear lower shaft 26; sprockets 27 provided on a rear upper shaft 28; sprockets 29 provided on a front upper shaft 30; and sprockets 31 provided on a front lower shaft 32.

Shaft 26 is suitably supported on the wall 9 in proximity to the slot 20 through the medium of bearing brackets 33, while shaft 28 is suitably supported by bearing brackets 34 mounted on the wall 9 adjacent the upper edge thereof and in proximity to a slot 35 provided therefor to accommodate chains 21.

Shaft 30 is similarly supported as at 36 on the front wall 8 while shaft 32 is similarly supported adjacent the lower edge of the wall 8 as at 37.

Also in accordance with the present invention and to provide for the spreading out of the manure laterally and rearwardly beyond the sides of the machine, there are mounted at the rear of the wagon box and beneath the bottom 6 thereof box like discharge spouts 38 that have laterally and outwardly curved rear discharge ends 39.

Manure from the wagon box enters the spouts 38 through the medium of openings 40 provided in the bottom 6 of the box (see Figure 6.)

To provide for a forced discharge of the manure from the spouts 38 there is suitably provided in each spout 38 an ejector element 41 which, as shown in Figure 6, is in the form of a screw formed integral with a shaft one end of which is suitably journaled in a bearing structure 42 provided therefor adjacent the discharge end of the spout 38 and the other end of which is journaled in a suitable bearing 43 mounted on the rear wall of the spout and is equipped with a gear 44 as and for a purpose hereinafter more fully mentioned.

Also, in accordance with the present invention there is mounted in the rear of the wagon box 5 a beater wheel 45 having blades 46 arranged on the wheel in longitudinal rows, with the blades of one row staggered in relation to the blades of the next succeeding row.

As the beater wheel 45 rotates the blades thereof move between, and in close proximity to fixed cleaner blades 47 that extend in a horizontal row across the rear of the wagon box and project from a plate 48 suitably mounted on the rear wall 9 of the wagon box. It will thus be seen that the blades 47 will serve to clean the batter blades 46 as the latter move past the blades 47 thus preventing clogging of the beater wheel.

Also for cooperation with the beating wheel 45 is a transverse row of cutting disks 49 that serve to comminute the particles of manure.

These disks are mounted in laterally spaced relation on a shaft 50 suitably journaled to extend between the side walls 7 of the wagon box. In this connection it will be noted that the blades 46 are accommodated between the disks 49, and in moving between the disks will prevent accumulation of manure particles between the disks and thereby prevent clogging of the cutter.

From the above it will be seen that in operation the conveyor tends to slowly feed the manure towards the rear of the wagon box and to the cutter 49, the particles of manure passing from the cutter 49 to the beater 46.

The chains 21 of the endless conveyor are driven from the rear axle 17 of the machine through a chain and sprocket drive connection 51 between said rear axle 17 and the rear lower shaft 26; the same including a sprocket 52 loose on the axle 17 and provided on one side with a clutch element 53 with which is cooperable a clutch element 54 mounted on the axle 17 to turn therewith and to shift longitudinally thereof into and out of engagement with the clutch element 53 through the medium of a key and key-way assembly indicated generally by the reference numeral 55.

The shaft 50 for the cutter blades 49 is also driven from the axle 17 through a chain and sprocket drive connection 56 which includes a sprocket 57 loose on the axle 17 and provided on one side thereof with a clutch element 58 with which is cooperable a complemental clutch element 59 also mounted on the axle 17 to rotate therewith and to slide longitudinally thereof into and out of engagement with the clutch element 58 through the medium of a key and way assembly indicated generally by the reference numeral 60.

The beater shaft 45 is driven directly from the cutter shaft 50 through the medium of a chain and sprocket drive connection 61.

The shafts of the conveyors 41 are driven from the axle 17 through the medium of a transverse shaft 62a suitably journaled above the axle 17 and provided at its respective opposite ends with gears 62 meshing with the aforementioned gears 44. Shaft 62a is driven from the axle 17 through the medium of a chain and sprocket mechanism 63.

The aforementioned chain and sprocket drive 63 includes a sprocket 64 provided on one side thereof with a clutch element 65 with which is cooperable a shiftable clutch element 66 mounted on the shaft 61 through the medium of a suitable key and way assembly indicated generally by the reference numeral 67.

It will be seen that all the moving parts of the device are driven from the axle 17 so that as the vehicle moves over the ground the endless conveyor is set in operation while at the same time cutters 49 and beater wheel 45 revolve for comminuting the particles of manure and for beating the manure prior to its discharge from the machine.

It will also be appreciated that drive to the various driven parts may be interrupted as found desirable and to that end there is provided for the shiftable clutch element 54 a shifting fork 68 provided on one end of a rod 69 that works in a suitably provided guide 70 and at one end is pivoted to one end of a bell crank 71 that in turn is pivotally mounted at the under side of the wagon box as at 72. Bell crank 71 is connected through the medium of a link 73 with a hand lever 74 suitably provided at the front of the wagon box. For the shiftable clutch element 59 there is provided a shifting fork 75 also provided on one end of a rod 76 that works in a suitably provided guide 77 and is connected at one end with a bell crank 78 that is also pivoted as at 72 and is connected through the medium of a link 79 with a hand lever 80 pivotally mounted at the front of the wagon box.

For the shiftable clutch element 66 there is provided a shifting fork 81 that is integral with one end of a bell crank 82 pivoted as at 83 at the under side of the wagon box and connected through the medium of a link 84 with a lever 85 also suitably provided at the front of the wagon box.

Levers 74, 80 and 85 are respectively provided with a spring dog or the like cooperable with a suitably provided rack 86 as suggested in Figure 1 whereby the selected hand lever may be held at the desired position of adjustment.

As will be understood, from the foregoing, under forward travel of the machine, the conveyor chains 21 are driven in a direction such that the lower sections thereof, and the cross rods 22, travel rearwardly over the bottom 7 of the box 5 out of the slot 20, the cutting discs 49 are rotated clockwise, as viewed in Figure 3, the beater wheel 45 is likewise rotated clockwise and the ejector elements 41 are rotated in a direction for rearward feed of manure out of the spouts 38. The wagon box 5 is loaded with a pile of manure in front of the cutting discs 49, preferably. Under the described action of the conveyor chains 21 and cross-rod 22, manure from said pile is conveyed to said discs and beater wheel 45 to be cut and beaten thereby into small particles and then ejected in part out of the slot 20 to fall on the ground in the rear of the machine. A part of the cut and beaten manure conveyed past the cutting discs 49 and the beater wheel 45 falls through the openings 40 in the bottom of the wagon box 5 into the spouts 38 to be ejected rearwardly therefrom by the ejector elements 41, the laterally and outwardly curving rear discharge ends of said spouts directing such manure beyond the side of the machine along opposite edges of the layer deposited in the rear of the machine by way of slot 20.

It is thought that a clear understanding of the construction, utility and advantages of a manure fertilizer spreader involving the features of the present invention will be had without a more detailed description.

Having thus described the invention what is claimed as new is:

1. In a manure spreader, a wheel-supported box-like body for manure having a bottom, and a rear end provided with a slot therein extending substantially across said body and opening onto said bottom, an endless conveyor on said body having a lower run extending from front to rear of the body and operative to move said run rearwardly and thereby eject the manure out of said slot onto the ground in the path of travel of the body, and means to eject manure from said body rearwardly and laterally of said path comprising a pair of box-like spouts mounted on said body at opposite sides thereof, respectively, and in rearwardly extending position beneath said bottom, said spouts having inner ends into which manure is fed by said conveyor, and rear discharge ends curving laterally outwardly, and means to operate said conveyor.

2. In a manure spreader, a wheel-supported box-like body for manure having a bottom, and a rear end provided with a slot therein extending substantially across the body and opening onto said bottom, an endless conveyor on said body having a lower run extending from front to rear of said body and operative to move said run rearwardly and thereby eject the manure out of said slot onto the ground in the path of travel of the body, means to eject manure from said body rearwardly and laterally of said path and comprising a pair of box-like spouts mounted on said body at opposite sides thereof, respectively, and in rearwardly extending position beneath said bottom, said spouts having inner ends into which manure is fed by said conveyor and rear discharge ends curving laterally outwardly, a beater rotatably mounted in said body transversely thereof for finely dividing the manure prior to ejection thereof, and means to operate said beater and conveyor, respectively.

3. In a manure spreader, a wheel-supported box-like body for manure having a bottom, and a rear end provided with a slot therein extending substantially across said body and opening onto said bottom, an endless conveyor on said body having a lower run extending from front to rear of the body and operative to move said run rearwardly and thereby eject the manure out of said slot onto the ground in the path of travel of said body, means to eject manure from said body rearwardly and laterally of said path comprising a pair of box-like spouts mounted on said body on opposite sides thereof, respectively, and in rearwardly extending position beneath said bottom, such spouts having inner ends into which manure is fed by said conveyors and rear discharge ends curving laterally and outwardly, ejector elements in said spouts, respectively, operative to forcibly eject manure therefrom, and means to operate said conveyor and elements, respectively.

4. In a manure spreader, a wheel-supported box-like body for manure having a bottom, and a rear end provided with a slot therein extending substantially across said body and opening onto said bottom, an endless conveyor on said body having a lower run extending from front to rear of the body and operative to move said run rearwardly and thereby eject the manure out of said slot onto the ground in the path of travel of the body, means to eject manure from said body rearwardly and laterally in said path comprising a pair of box-like spouts mounted on said body at opposite sides thereof, respectively, and in rearwardly extending position beneath said body, said spouts having inner ends into which manure is fed by said conveyor and rear discharge ends curving laterally outwardly, a beater rotatably mounted in said body transversely thereof for finely dividing the manure prior to ejection thereof, a cutting assembly in said body operative in conjunction with said beater to finely comminute the manure, ejector elements in said spouts, respectively, operative to forcibly eject manure therefrom, and drive means for said conveyor, beater, cutting assembly and elements operative under forward travel of said body.

RICHARD A. JOHNSON.